Feb. 9, 1960            J. G. GILES            2,924,123
VARIABLE RATIO HYDRAULIC TORQUE CONVERTER
Filed Jan. 18, 1957
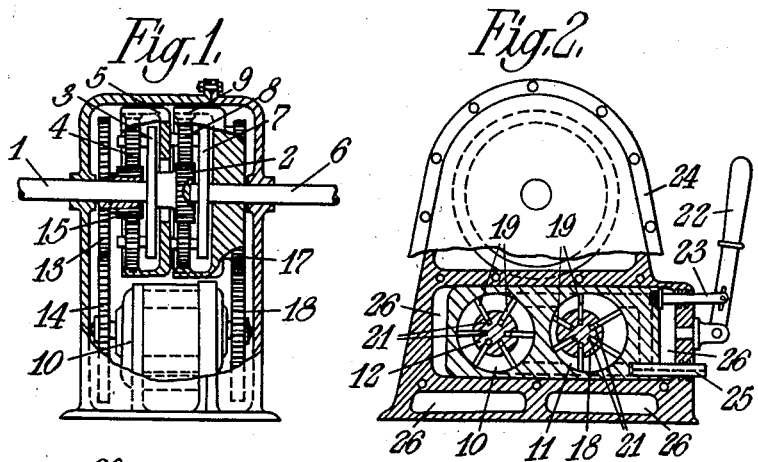
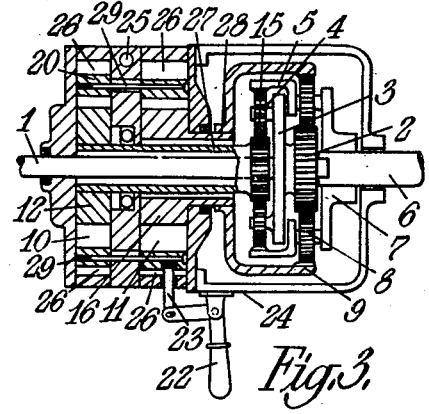
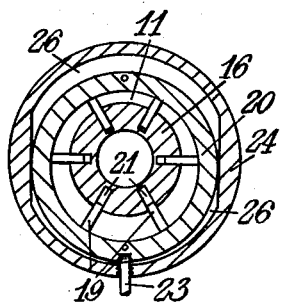
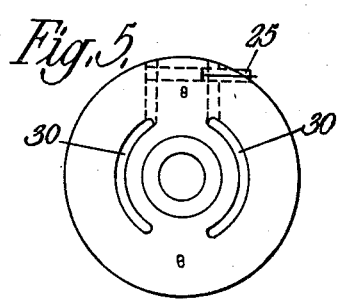
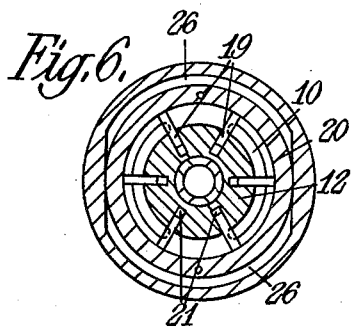
Inventor
J. G. Giles

United States Patent Office 2,924,123
Patented Feb. 9, 1960

2,924,123

VARIABLE RATIO HYDRAULIC TORQUE CONVERTER

John George Giles, Sevenoaks, England, assignor to The Motor Industry Research Association, Lindley, near Nuneaton, England, a corporation of Great Britain Application January 18, 1957, Serial No. 634,879

6 Claims. (Cl. 74—687)

The present invention relates to the transmission of power from an engine or engine(s) to an output shaft which may be required to rotate at any speed within the working range of speeds of rotation while delivering power. The torque converter described in this invention provides a range of torque conversion ratios so that any ratio within this range may be selected to suit the operating conditions. This invention employs a combination of epicyclic or planetary gearing and positive displacement hydraulic pump/motor units. The hydraulic units of variable displacement capacity, such as vane pumps and vane motors, are used in this invention, and these said hydraulic units are arranged so as to form a closed cycle hydraulic drive in which the hydraulic fluid circulates continuously. In this invention the discharge from the hydraulic pump unit is directed into the hydraulic motor unit and the fluid discharged from the motor unit returns to the inlet of the hydraulic pump. A control lever is connected to a sliding casing which contains both hydraulic units and the necessary ducting for the flow of hydraulic fluid, and movement of the said lever in this invention moves the pump and motor casings relative to the pump and motor rotors. Thus, in the case where vane type hydraulic units are used for this invention, movement of the said control lever causes the vane track guide rings to move relative to the vane rotors which are so positioned that movement of the lever or casing in any direction causes the output displacement capacity of one hydraulic unit to increase whilst the output capacity of the other unit decreases. The limits of the movement of this control lever and casing are reached for this said invention when one hydraulic unit reaches zero displacement capacity, and at this point it is arranged that the other hydraulic unit will have reached maximum displacement capacity and will be unable to rotate due to the fact that no hydraulic fluid can pass through the hydraulic unit which is adjusted to zero displacement capacity. It is evident therefore that, in this invention, adjustment of the control lever will provide any desired ratio of rotation between the hydraulic rotors of the vane pump and vane motor respectively.

The planetary gearing in this invention consists of two epicyclic differential gearing sets arranged so that in each set of gearing, one rotary member is connected to the input shaft, another rotary member is connected to the output shaft, whilst a third rotary member, afterwards referred to as the control member, is connected or geared to one of the hydraulic units mentioned above. The choice of gearing for this invention is dependent on the design requirements for torque conversion but in every case one differential case can be referred to as the low gear differential and the other differential can be referred to as the high gear differential.

In this said invention the sun wheel in high gear differential is used as the control member and is attached or geared to the hydraulic pump unit. The input shaft is connected to the planet carrier member whilst the output shaft is connected to the annulus member of the high gear differential. In the low gear differential the annulus member is used as the control member and is connected or geared to the hydraulic motor. The input shaft connects with the sun wheel of the low gear differential whose planet carrier is connected to the output shaft for this invention. The hydraulic drive consisting of variable capacity pump and motor provides a by-pass connection for some power flow between the control members in this invention and adjustment of the ratio of speeds of the hydraulic pump and motor by means of the control lever is reflected by changes in the torques pertaining to all differential gearing members. The hydraulic drive is used in this invention to control the ratio of the torques on the control members and this torque ratio of these control members is mathematically related to the ratio of torque conversion between input and output shafts. Changes in torque conversion ratio are made, therefore, in this invention by adjustment of the control lever to give the appropriate torque ratio between the two control members. The range of torque conversion provided by this invention is that obtained between the limits of control lever movement, so that with the hydraulic motor at maximum eccentricity or displacement the output shaft torque is equal to that given by the low gear differential with the control member locked and the input shaft connected to the sun wheel. At the other limit of control lever and casing movement, the hydraulic pump is in the position for maximum displacement and is locked stationary, so that output torque is equal to that given by the input shaft connected to the high gear differential annulus with the sun wheel stopped. In the intermediate positions of the control lever, input and output torques are shared between the two differential gears and the torque conversion ratio varies smoothly between the two limits as the control lever is moved in either direction between these limits.

The present invention is illustrated by way of example in the accompanying drawings which depict suitable arrangements of this torque converter.

Figure 1 is a sectional side view of a version of this torque converter,

Figure 2 is a sectional end view of this version,

Figure 3 is a sectional side view of an alternative arrangement in which the hydraulic pump and motor unit are mounted concentrically on the input shaft of this torque converter.

Figure 4 is a view in section of the hydraulic motor unit used in the torque converter shown in Figure 3.

Figure 5 is a view in section of the central hydraulic control and port plate used in the torque converter shown in Figure 3.

Figure 6 is a view in section of the hydraulic pump unit used in the converter shown in Figure 3.

Considering Figures 1 and 2: Input power from a shaft 1 is transmitted to an input member consisting of a sun wheel 2 and a planet carrier 3 containing planet wheels 4 which engage with the annulus 5 of the high gear differential. Output power is transmitted to the output shaft 6 by another combined component consisting of the annulus 5 and a planet carrier 7 containing planet wheels 8 and engage with the control annulus 9. A hydraulic drive consisting of a hydraulic vane pump 10 and vane motor 11 is connected between the two control members so that vane pump rotor 12 is connected by gearing 13, 14 to the sun wheel 15 of the high gear differential set, whilst the rotor 16 of the vane motor is similarly connected by gearing 17, 18 to the annlus 9 of the low gear differential set. The vanes 19 of the two hydraulic units rotate in circular tracks contained in a sliding block or casing 20 which can be adjusted to vary the eccentricity of these vane tracks as compared to the vane rotors 12 and 16. These said vanes slide in and out of vane slots 21 in the rotors as the hydraulic units rotate under power. A control lever 22 is connected by a rod 23 screwed into the sliding casing 20 and passing through a sealed port in the main body structure 24 and this lever adjusts the eccentricity of the vane units by moving the casings 20 in order to alter the fluid delivery from both hydraulic units. In the position depicted (Figure 2) the vane pump 10 is shown at zero delivery when the rotor and vane tracks are concentric with each other. In this invention the components are arranged so that in the position shown in Figure 2 the vane motor 11 is at its maximum eccentricity and maximum delivery. As the lever and casing are moved to the left the eccentricity of the vane motor 11 decreases whilst the eccentricity and delivery of the vane pump 10 increases until it reaches a maximum, when the delivery of the vane motor will have decreased to zero, and this position is the other limit of travel of the lever and casing. At these limit positions, either the sun wheel 15 or the annulus 9 are locked stationary so as to give the limiting torque ratios, while for intermediate positions of the control lever and casing, torque conversion ratios lying between these limiting ratios can be obtained. A pressure relief valve 25 is shown in Figure 2 and is arranged so that hydraulic pressure developed in the vane pump can be released so that the torques existing on the control members can be reduced or removed altogether. This valve is situated in the sliding casing and can be controlled externally by the use of sealed linkage which passes through the main body structure 24. Spaces 26 around the sliding casing are used in this invention to provide a reservoir 26 of the hydraulic fluid.

In Figure 3 an alternative arrangement is shown and illustrates how the hydraulic pump and motor unit may be mounted concentrically on the input shaft. This version of the invention results in a more compact unit and removes the necessity for the geared drives between the control members and hydraulic units.

Considering Figure 3, therefore, input power from a shaft 1 is transmitted to an input member consisting of a sun wheel 2 and a planet carrier 3 which contains planet wheels 4 engaging with an annulus 5 of the high gear differential. Output power is transmitted to the output shaft by a combined component consisting of the annulus 5 and a planet carrier 7 containing planet wheels 8 which engage with the control annulus 9. A hydraulic drive consisting of a hydraulic vane pump 10 and vane motor 11 is connected between the two control members so that the vane pump rotor 12 is connected by a concentric hollow shaft 27 to the sun wheel 15 and the high gear differential, whilst the rotor 16 of the vane motor is similarly connected by another concentric hollow shaft 28 to the annulus 9 of the low gear differential. The vanes 19 of the two hydraulic units rotate in circular tracks contained in a sliding block or casing 20 which can be adjusted to vary the eccentricity of these vane tracks as compared to the vane rotors 12, 16. The said vanes slide in and out of vane slots 21 in the rotors as the hydraulic units rotate under power. A control lever 22 is connected by a rod 23 screwed into the sliding casing 20 and passing through a sealed port in the main body structure 24 and this lever adjusts the displacement of the vane units by moving the casings 20 which are connected by means of bolts or screws 29 so that the displacements of both vane units are varied by movement of this lever. In the position depicted (Figure 4) the vane pump 10 is shown at zero displacement capacity when the rotor and vane track are concentric with each other. In this invention the two sliding casings are interconnected by the screws 29 so that the vane motor 11 is at its maximum eccentricity and zero displacement. As the lever is moved to the left the eccentricity of the vane motor 11 (Figure 4) decreases whilst the eccentricity and delivery of the vane pump 10 (Figure 6) increases until it reaches a maximum, when the vane motor delivery will have decreased to zero and this position is the other limit of travel of the lever and casings. At these limit positions, either the sun wheel 15 or the annulus 9 is locked stationary in order to give the limiting torque ratios, whilst for intermediate positions of the control lever and casings, torque conversion ratios lying between these limiting ratios can be obtained. A pressure relief valve 25 is shown in Figure 5 and is arranged so that hydraulic pressure developed in the vane pump can be released so that the torque existing on the control members will be reduced or removed altogether. This valve is situated in the central control and port plate (Figure 5) which separates the pump and motor units. Ports 30 in this plate are situated so as to allow flow of fluid between the pump and motor units in accordance with the requirements of the hydraulic drive. Spaces 26 around the sliding casings are used to provide a reservoir for hydraulic fluid.

I claim:

1. A torque converter unit comprising two concentric planetary differential gear systems, an input and an output shaft, a hydraulic drive including two positive displacement type hydraulic units having their rotors each fixed to a shaft drivingly connected respectively to one of said concentric planetary differential gear systems, a slidably mounted casing having two separate chambers, one chamber containing each of said rotors, the distance between the axes of said chambers being different than the distance between the axes of said rotors, and means for varying the position of said casing so as to vary simultaneously the degree of eccentricity between said rotors and to thereby effect corresponding variations in the ratio of the speeds of the two concentric planetary differential gear systems.

2. A torque converter unit comprising two coaxial planetary differential gear systems, each including sun, planet and ring gears, coaxially arranged input and output shafts each fixedly secured to one operative element of each of said coaxial planetary differential gear systems, a hydraulic drive including two positive displacement rotor type hydraulic units having their rotors drivingly connected respectively to a different one element of each of said two coaxial planetary differential gear systems and disposed within a slidably mounted casing, each of said rotors having a set of radial vanes slidably mounted in radial slots in the rotor body, and means for varying the position of said casing so as to move each rotor laterally simultaneously with respect to said casing and vary the degree of eccentricity of said rotors and thereby effect corresponding variations in the ratio of the speeds of the two differential gears.

3. A torque converter unit comprising two concentric planetary differential gear means, the first of said planetary differential gear means being a low gear unit and the second planetary gear means being a high gear unit, each said planetary differential gear means comprising a sun gear, at least one planet gear, a planet gear carrier, and a ring gear; an input shaft for the torque converter concentric with said differential gear means, said input shaft being drivingly connected to the sun gear of said first of said two planetary differential gear means and to the planet gear carrier of said second of said two planetary differential gear means; and an output shaft for the torque converter unit concentric with said two concentric planetary differential gear means, said output shaft being drivingly connected to the planet gear carrier of said second planetary differential gear means and to the ring gear of said first of said two planetary differential gear means; variable speed hydraulic drive means comprising a hydraulic pump unit and a hydraulic motor unit, said hydraulic pump unit being driven by and at the same speed as the sun gear of said first planetary differential gear means, and said hydraulic motor drivingly engaging the ring gear of said second of said planetary differential gear means to drive said ring gear at the same speed as said hydraulic motor.

4. The torque converter of claim 1, in which said variable speed hydraulic drive means comprises an outer casing, two rotatable shafts mounted in said outer casing parallel to the axis of said planetary differential gear means, a gear mounted on a first of said shafts exteriorly of said casing, a gear fixed to the sun gear of said second planetary differential gear means, a vane pump rotor mounted on said first of said shafts within said outer casing, a gear fixed to the second said shaft exteriorly of said outer casing, a gear fixed to the ring gear of said first planetary differential gear means, a motor rotor mounted on said second shaft interiorly of said outer casing, said casing being so located with respect to said concentric planetary differential gear means that said gear on said first of said shafts and said gear on said second of said shafts mesh with said gear fixed to said sun gear and with said gear fixed to said ring gear, respectively, and an interior casing slidable within said outer casing, two rotor chambers in said inner casing to receive respectively the rotor mounted on said first shaft and the rotor mounted on said second shaft, fluid passages connecting said two rotor chambers, the distance between the axes of said rotor chambers being greater than the distance between said shaft, and means to slidably move said inner casing within said outer casing to vary the relative speed of rotation of said ring gear of said first and said sun gear of said first and said second planetary differential gear means.

5. A torque converter comprising two coaxial planetary gear units, the first planetary gear unit being a high gear unit and the second planetary gear unit being a low gear unit, each unit comprising three elements, a sun gear, a ring gear, and an assemblage including planetary gear carrier, planetary gears on said gear carrier cooperating with the respective sun and ring gears, an input shaft for said torque converter coaxial with said two coaxial planetary gear units, and an output shaft for said torque converter coaxial with said two coaxial planetary gear units, said input shaft being drivingly engaged with a first element of each of said two coaxial planetary gear units, and said output shaft being engaged with a second one element of each of said two coaxial planetary gear units, a hollow shaft coaxial with said torque converter rotatably supporting the third element of said high gear unit, a second hollow shaft coaxial with said torque converter rotatably connected to the third element of said low gear unit, a hydraulic variable speed means comprising a hydraulic pump unit and a hydraulic motor unit, said pump unit being mounted on said first hollow shaft and said motor unit being mounted on said second hollow shaft, and means to control the speed ratio between said pump means and said motor means.

6. A torque converter comprising an input shaft, a first planetary gear carrier on said input shaft, and a first sun gear on said input shaft, an output shaft, a second planetary gear carrier on said output shaft, planetary gears on said second planetary gear carrier meshing with said first sun gear, a first ring gear carried by said second planetary gear carrier to surround said first planetary gear carrier, a second sun gear mounted for rotation coaxially of said input shaft and lying within said first planetary gear carrier, planetary gears on said first planetary gear carrier meshing with said first ring gear and with said second sun gear, a second ring gear surrounding said second planetary gear carrier meshing with said planetary gears on said second planetary gear carrier, and adjustable speed drive means connecting said second sun gear and said second ring gear.

References Cited in the file of this patent

UNITED STATES PATENTS

| | | |
|---|---|---|
| 2,235,370 | Jandasek | Mar. 18, 1941 |
| 2,285,431 | Grossenbacher | June 9, 1942 |
| 2,384,776 | Trofimov | Sept. 11, 1945 |
| 2,390,240 | De Lancey | Dec. 4, 1945 |
| 2,464,275 | Trofimov | Mar. 15, 1949 |
| 2,599,814 | Cull | June 10, 1952 |
| 2,808,737 | Bullard | Oct. 8, 1957 |

FOREIGN PATENTS

| | | |
|---|---|---|
| 884,337 | France | Apr. 19, 1943 |